ABSTRACT
United States Patent [19]

Logsdon

[11] Patent Number: 5,052,726

[45] Date of Patent: Oct. 1, 1991

[54] SEAL STRUCTURES FOR FLANGES HAVING BOWED SEALING SURFACES

[75] Inventor: Duane D. Logsdon, Fullerton, Calif.

[73] Assignee: Logsdon Foundation, Fullerton, Calif.

[21] Appl. No.: 426,097

[22] Filed: Oct. 24, 1989

[51] Int. Cl.$^5$ .............................................. F16L 23/00
[52] U.S. Cl. ...................................... 285/341; 285/56; 285/338; 285/346; 285/413; 285/910; 277/215; 277/169
[58] Field of Search .................. 285/56, 337, 338, 341, 285/346, 413, 910; 277/170, 207 A, 210, 215, 169

[56] References Cited

U.S. PATENT DOCUMENTS

| | | | |
|---|---|---|---|
| 1,989,897 | 6/1933 | Anderson et al. | 285/341 X |
| 2,613,959 | 12/1948 | Richardson | 285/341 |
| 3,174,778 | 5/1962 | Gross | 285/341 |
| 3,579,670 | 7/1968 | Frank | 4/252 R |

FOREIGN PATENT DOCUMENTS

| | | | |
|---|---|---|---|
| 1423894 | 11/1965 | France | 285/341 |
| 0506965 | 7/1956 | Italy | 285/341 |
| 0749395 | 5/1956 | United Kingdom | 285/341 |

*Primary Examiner*—Dave W. Arola
*Assistant Examiner*—Tim Aberle
*Attorney, Agent, or Firm*—Joseph C. Andras

[57] ABSTRACT

A desirable seal structure for use in forming a seal around the exterior of a pipe or the like can be constructed so as to use a retainer member, a compression member, a sealing member located generally within the retainer member and generally between the compression and retainer members and bolts for compressing the retainer and compression members against the sealing member. The compression and retainer members are provided with beveled surfaces which are complementary to corresponding tapered surfaces on the sealing member. The sealing member is shaped so that it will move inwardly when compressed between the compression and retainer members.

5 Claims, 2 Drawing Sheets

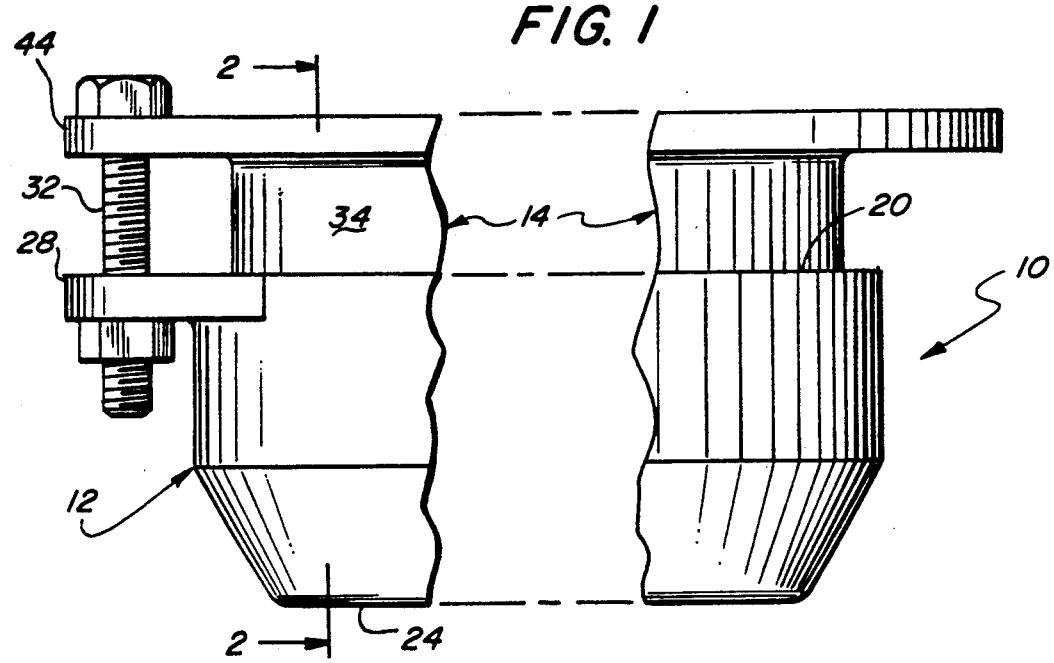
FIG. 1
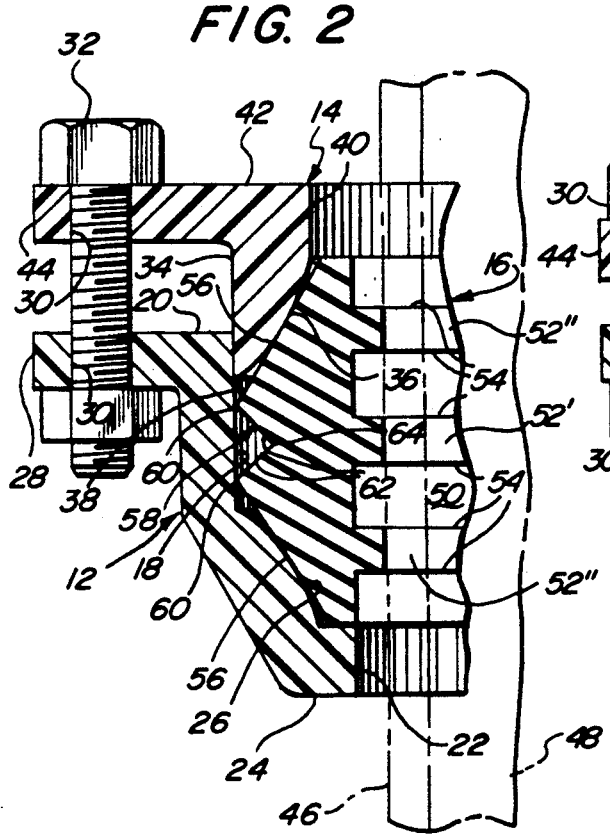
FIG. 2
FIG. 5

SEAL STRUCTURES FOR FLANGES HAVING BOWED SEALING SURFACES

BACKGROUND OF THE INVENTION

The invention set forth and claimed in this application pertains to new and improved seal structures. More specifically it pertains to sealing structures which are primarily useful in mounting toilet bowls. On occasion sealing structures for this latter utility are often referred to as "closet flanges."

An understanding of the present invention does not require a review of or an understanding of all different prior sealing structures or closet flanges which are in any way related to the subject matter of the invention. However, an understanding of the invention is best predicated or based on a review and an understanding of the prior art sealing structure which is considered to be the closest to that of the present invention. This prior art structure is constructed in accordance with the Frank U.S. Pat. No. 3,579,670 issued May 25, 1971 entitled "Pipe Connector." The sealing structures shown and described in this Frank patent are considered to be desirable commercially.

However, it is believed that sealing structures as shown in this prior patent are not quite as desirable as one in the plumbing industry might desire in one very important regard. It is believed that such prior structures do not form seals against the exteriors of pipes which are as "positive" as may be required in all eventualities and which are adequately resistant to forces which might tend to disturb or effect the sealing action obtained against the exterior of a pipe. It is considered that the limitations of sealing structures as shown in this prior patent are primarily the result of the shapes of the sealing rings and the portions of the retainer and compression rings used in these prior devices and the fact that these parts do not cooperate together in these prior art devices so as to expand the sealing ring into a desired efficient configuration.

BRIEF SUMMARY OF THE INVENTION

It is believed that it will be apparent from the preceding that there is a need for new and improved sealing structures. Broadly the present invention is intended to provide sealing structures which are responsive to this need.

The invention is intended to provide sealing structures of the type indicated by the preceding discussion which, although capable of being constructed at about the same cost as prior related sealing structures, are capable of being used so as to obtain more effective, desirable seals than the prior related structures. Further, the invention is intended to provide sealing structures as described which are no more difficult to install than the prior art related sealing structures and which are effective over prolonged periods and which are relatively immune to the normal effects of vibration and the like.

In accordance with this invention these various objectives are achieved in a seal structure for use in forming a seal against the periphery of a cylindrical member such as a sewer pipe. The seal structure includes an annular retainer member, an annular compression member, and an elastomeric sealing member. The elastomeric sealing member is positioned against the retainer member so that it is expanded internally as it is engaged by the compression member and as the compression member is moved against the sealing member and generally toward the retainer member. A bolt means extends between the retainer member and the compression member for moving the compression member against the sealing member.

In the seal structure, the retainer member is an annular member which includes a vertically-extending internal cylindrical surface. A continuous, annular internal flange is located perpendicularly to, and extends inwardly from, the lower end of the internal cylindrical surface. A continuous, annular, internal beveled wall extends completely around the interior of the internal cylindrical surface from intermediate the ends of the internal cylindrical surface to intermediate the interior and exterior extremities of the internal flange. The lower beveled wall extends outwardly from the internal cylindrical surface. A first connecting flange connects the retainer member to the compression member extending from the exterior of the retainer member.

The compression member is an annular member which includes a vertically-extending external cylindrical surface which fits closely within and is movable with respect to the internal cylindrical surface. An internal annular beveled wall is located so as to extend inwardly from the lower edge of the external cylindrical surface. A second connecting flange connects the compression member to the retainer member.

The sealing member in an uncompressed condition has an internal substantially cylindrical surface. There are at least three sealing ridges spaced from and parallel to one another. They extend inwardly of the substantially cylindrical surface. Top and bottom continuous tapered surfaces extend around the upper and lower ends of the substantially cylindrical surface. A continuous "Vee" groove on the exterior of the member is positioned between the tapered surfaces and the top and bottom ends. The sealing member is located generally within the internal cylindrical surface with the top tapered surface located against the beveled wall of the compression member. The bottom tapered surface is located against the lowered beveled wall of the retainer member.

The sealing member is capable of flexing so that the substantially cylindrical surface is distorted and the portion of the substantially cylindrical surface opposite the "Vee" groove is bowed inwardly from the ends of the sealing member. This flexing occurs as the bolt pulls the compression and retainer members together. The bowing causes the sealing ridges to be distorted against a cylindrical member extending through the sealing, retainer, and compression members.

BRIEF DESCRIPTION OF THE DRAWING

Because of the nature of this invention it is believed that it is best more fully described by referring to the accompanying drawing in which:

FIG. 1 is a side elevational view of a presently preferred seal structure in accordance with the invention with the parts in such adjustment that the sealing member or ring used is not under compression;

FIG. 2 is a partial cross-sectional view taken at line 2-2 of FIG. 1 at an enlarged scale;

FIG. 5 is a cross-sectional view which is the same as FIG. 2 except that this view shows the seal structure adjusted so as to place the sealing member under compression. The seal member being shown in this view in a diagrammatic manner.

Figure 3:
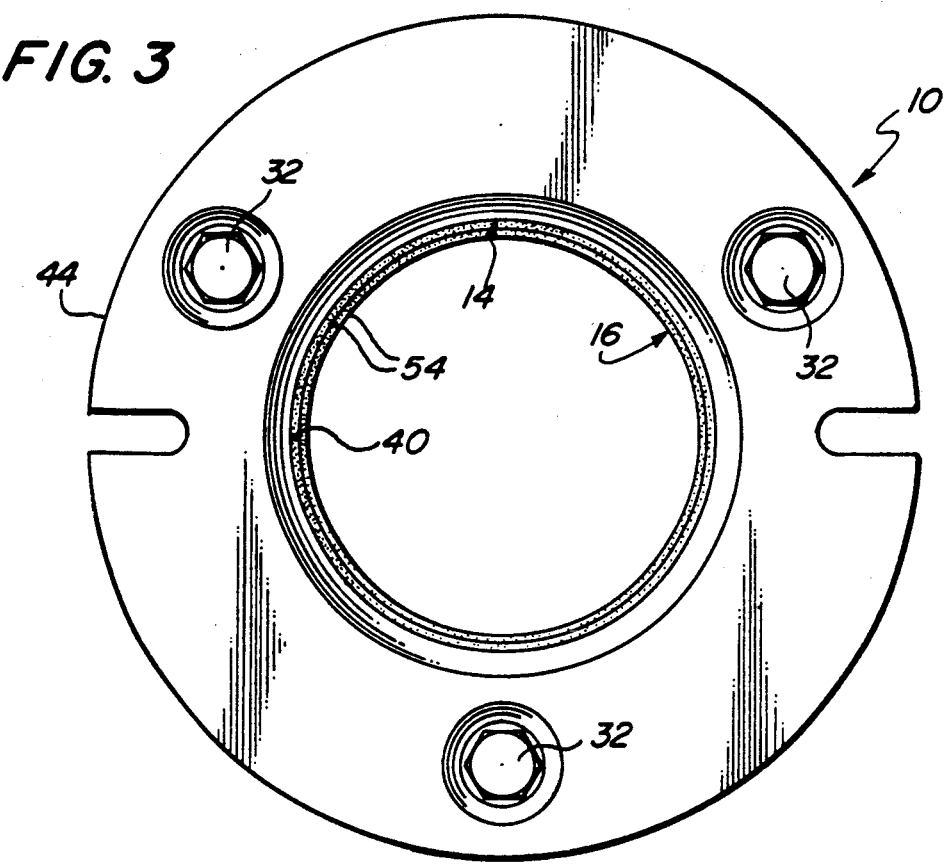
FIG. 3 is a top plan view of the seal structure.
Figure 4:
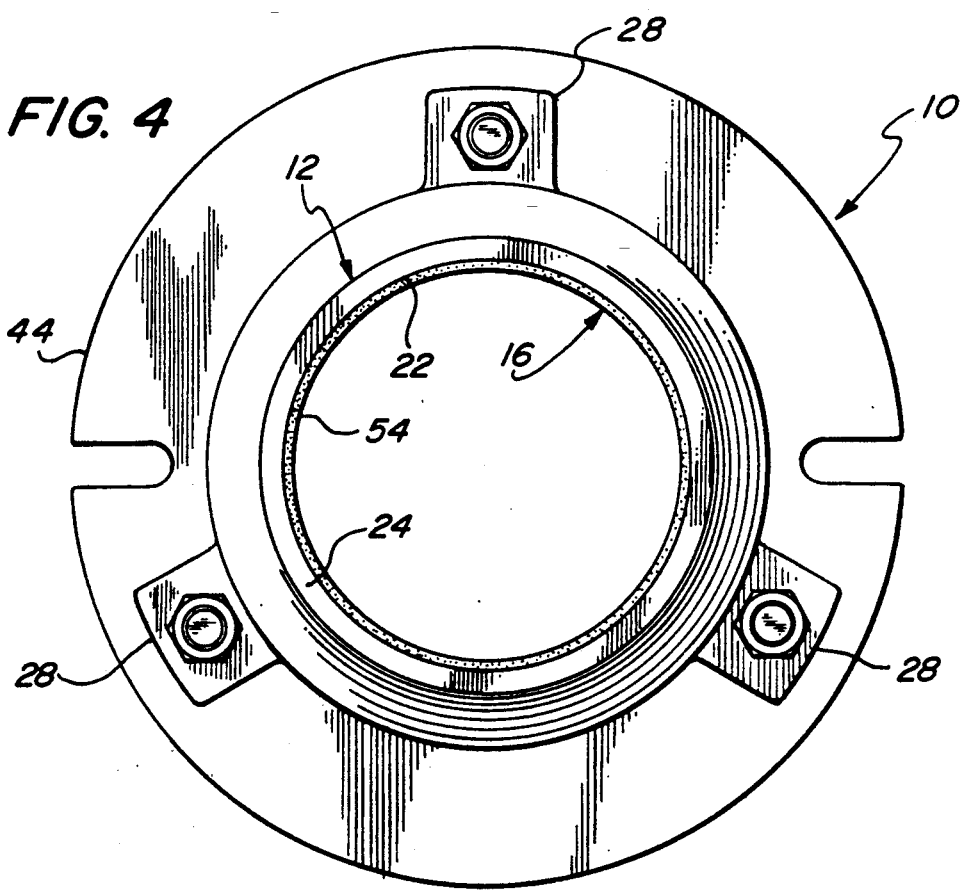
FIG. 4 is a bottom plan view of the seal structure.

The particular seal structure illustrated in the drawing is constructed so as to utilize the essentially intangible concepts or principles of the invention set forth in the appended claims. It is not intended to illustrate a precise seal structure in accordance with the invention drawn to scale. Those skilled in the field of seal structures as are used with sewer pipe and the like will realize that the field of the invention is quite crowded and that the seal structures of the present invention are of such a character that very little change can be made in the precise seal structure illustrated without departing from the concepts of the invention.

Nevertheless minor changes can be made in the precise seal structure illustrated through the use of routine skill in the field of the invention without departing from the scope of the invention as defined in the appended claims. As an example of this minor changes in relative proportions and shapes can be made as reasonably required to adapt the precise seal structure illustrated for use with pipes of different sizes.

DETAILED DESCRIPTION OF THE PREFERRED EMBODIMENT

In the drawing there is shown a seal structure 10 in accordance with the present invention which includes an annular retainer member or ring 12, an annular compression member or ring 14, an annular elastomeric sealing member or ring 16 and a series of conventional bolts or bolt means 32.

Although the members 12 and 14 can be formed out of a rigid material such as cast iron it is preferred to form them out of a substantially rigid material such as any of a series of common, known polymer or plastic materials such as common ABS resin or the like which are rigid, lighter in weight than cast iron per unit volume and which are substantially incapable of corrosion or similar degradation under the normal conditions of use of the structure 10. The seal member 16 is preferably formed out of a known elastomeric material such an any variety of synthetic rubbers commonly used in the manufacture of sealing rings of various types.

The retainer member 12 is shaped so as to include a short, vertically extending, internal cylindrical surface 18 which extends downwardly from an upper end or top 20 of the member 12. It also includes a continuous, annular, internal flange 22 which extends inwardly from the surface 18 at the bottom 24 of the member 12 so as to be transverse or perpendicular to this surface 18. The flange 22 is joined to the internal cylindrical surface 18 by a short lower beveled wall 26 located so as to extend outwardly from the surface 18 generally toward the interior of the surface 18 and toward the flange 22. All of the parts of the member 12 described in this paragraph are surfaces of revolution.

Although the precise slope of the beveled wall 26 is a matter of choice it is currently believed that most satisfactory results are achieved when the slope of this wall 26 is from about 25 to about 45 degrees to the vertical. The reasons for this pertain to the manner in which the wall 26 fits against the seal member 14 as subsequently described. Surprisingly it is considered that best results are achieved when this wall 26 is not of a "pure" or conventional shape of a frustum of a right circular cone but instead deviates slightly from such shape so as to be bowed slightly toward the interior of the surface 18 as illustrated.

The member 12 also includes what may be referred to as "flange means" or flange 28 extending outwardly adjacent to the upper end or top 20. The precise construction of this flange means is not critical with the invention. Thus it need not be a continuous annular ring; instead it can be a series of extending ears. The important thing is that this flange 28 contain holes 30 which can be used in conjunction with conventional bolts 32 or other related fasteners in order to secure the retainer member 12 to the compression member 14.

This compression member 14 is shaped so as to include a vertically extending, external cylindrical surface 34 which is of such dimension as to fit closely within the surface 18 without fitting so tightly within this surface 18 that it cannot be moved with respect to it. This is to enable the compression member 14 to be moved toward the retainer member 12 when the compression member 14 is assembled as shown with the surface 34 fitting into the surface 18. The compression member 14 also includes a lower, annular beveled wall 36 which extends upwardly and inwardly from a lower edge 38 of the surface 34. This beveled wall 36 is preferably formed so as to be the same as the wall 26 except for the direction in which it is slanted. It terminates in an internal cylindrical wall 40 leading to the top 42 of the member 14.

With this construction the walls 26 and 36 are located so as to in effect be opposite to one another and so that they only move toward one another in a linear path. Such movement is accomplished through the use of another "flange means" or flange 44 approximately corresponding to the previously described flange 28. This flange 44 contains other holes 30 which are aligned with the previously described holes 30. In addition it also preferably contains slots which may be used in a conventional manner in connecting the flange 44 into an operative manner, as, for example in mounting a common toilet or water closet bowl (not shown).

As illustrated the bolts 32 extend through the holes 30 in the flange 44 so as to connect the members 12 and 14. Normally these bolts 32 will only be tightened so as to bring these members 12 and 14 toward one another when the sealing member 16 is in place as shown in FIG. 2 of the drawing and when the entire seal structure 10 is in place around the periphery 46 of a conventional pipe 48 such as a sewer pipe used in connection with a toilet or water closet bowl (not shown). Since such a pipe 48 is not part of the invention but is normally used with the seal structure 10 it and the periphery 46 are only illustrated by phantom lines in FIG. 2 of the drawing.

When the sealing member 16 is in place and is not compressed, an internal, cylindrical or substantially cylindrical surface 50 will be opposite and adjacent to, but spaced slightly from the periphery 46 of the pipe 48. Also small sealing ridges or rings 52 which extend internally from the surface 50 will also be preferably so spaced relative to the periphery of the pipe 48. These ridges 52 are considered important to the invention. Although they can be shaped as the inter portions of common O-rings preferably they are shaped as shown in FIG. 2 so as to each have a rectangular, substantially square cross-sectional configuration so as to provide sealing edges 54.

These ridges 52 are all located transverse to the surface 50. Although the number of these ridges can be varied it is considered that it is best from an economic and practical standpoint to use 3 of these ridges 52 as shown. It will be noted that one of these ridges-the ridge 52' is located midway along the length of the surface 50 while the other ridges 52" are spaced from and parallel to this ridge 52' approximately equal distances. The precise spacing between the ridges 52' and 52" presently appears to be essentially a matter of choice so long as they are spaced sufficiently so that the compression of the ridge 52' as the seal structure 10 is used does not cause any deformation of the seal structures 52" apart from the deformation resulting from other deformation of the sealing member 16.

When the sealing member 16 is in place, and is uncompressed, beveled walls 56 on it will be opposite and in contact with the previously described beveled walls 26 and 36. These walls 56 are frustums of right circular cones extending at angles which would be the same as the angles of the walls 26 and 36 if the latter walls 26 and 36 were not bowed as previously indicated and as shown in the drawing. From FIG. 2 it will apparent that these walls 26 and 36 are bowed so as to be of a convex configuration directly adjacent to the walls 56. This is intended to promote the deformation and sealing action of the sealing member 16 when the seal structure 10 is used.

It will be apparent from the preceding that when this seal structure 10 is to be used it will be assembled as illustrated in FIG. 2 around a pipe 48. Next the bolts 32 will be tightened. As this occurs pressure will be applied by the walls 26 and 36 against the walls 56 so as to place the sealing member 16 under axial compression. Alone this would be adequate to normally cause the internal surface 50 to bow inwardly to some extent as illustrated in FIG. 5 until such time as the bowing was limited by the pipe 48 being engaged by the sealing ridges 52 and the surface 50. In accordance with the invention it is considered that it is desirable to supplement such bowing and to tend to make the bowing more pronounced in such a manner that the ridges 52 and the portions (not separately numbered) of the surface 50 engaging the periphery 46 are "cushioned" to a degree.

In accordance with the invention this accomplished by providing an external, annular "Vee" groove 58 in the sealing member 16 directly opposite the ridge 52'. This groove 58 is located between the outer edges 60 of the walls 56. These outer edges 60, when the sealing member 16 is uncompressed, will normally be of such a diameter as to fit within the cylindrical surface 18 as the cylindrical wall 38 fits within this surface 18. It is presently considered that best results will be obtained if the groove 58 is of such a shape so that in cross-section the walls 62 of it are located about 45 degrees to one another. It is considered that suitable results can be normally achieved if this angle is from about 30 to about 60 degrees provided that the groove 58 is of such depth as to extend at least about 25% of the distance between the outer edges 60 and the surface 50.

This is intended to provide a cross-sectional configuration of the sealing member 16 such that the bottom 64 of the groove acts more or less as a pivot as the sealing member 16 is compressed so as to promote bowing or expansion of the surface 50. It is presently considered that if the groove extends more than about 50% of the distance between the edges 60 and the surface 50 that there is a possibility that the sealing member 16 will be weakened so that it may either tend to be damaged as it is normally compressed or so that a desired deformation of the surface 50 is not obtained.

As this compression of the sealing member 16 continues through the tightening of the bolts 32, except for the presence of the pipe 48, the sealing member 16 would tend to expand with a more or less folding type action about the bottom 64 of the groove 58 to a configuration as shown in FIG. 5. As a result of such expansion and of the location of the ridge 52' this ridge will form a direct compression type of seal against the periphery 46 of the pipe 48 while concurrently the other sealing ridges 52" will be tilted slightly so that the edges 54 on them tend to serve more or less as the relatively pointed edges on a windshield wiper so as to obtain a somewhat different type of seal. As a result of their bulk these ridges 58 will be sufficiently massive so as to be capable of withstanding forces which might interfer with the sealing action obtained with them.

I claim:

1. A seal structure for use in forming a seal against the periphery of a cylindrical member such as a sewer pipe when mounting a toilet bowl in a bathroom, said structure including an annular retainer member, an annular compression member, an elastomeric sealing member positioned against said retainer member in a position so that it is expanded internally as it is engaged by said compression member and as said compression member is moved against said sealing member and generally toward said retainer member and bolt means extending between said retainer member and said compression member for moving said compression member against said sealing member in which the improvement comprises:

said retainer member being annular and including a vertically extending internal cylindrical surface, a continuous, annular internal flange extending perpendicularly inward from the lower end of said internal cylindrical surface, a continuous, annular, internal beveled wall extending completely around the interior of said internal cylindrical surface from the ends of said internal cylindrical surface to approximately halfway between the interior and exterior extremities of said internal flange, and first connecting flange means for use in connecting said retainer member to said compression member extending from the exterior of said retainer member, said compression member being annular and including a vertically extending external cylindrical surface fitting closely within said internal cylindrical surface and being movable with respect to said internal cylindrical surface, an internal annular beveled wall extending the lower edge of said external cylindrical surface and second connecting flange means for use in connecting said compression member to said retainer member, said sealing member in a uncompressed condition having a substantially cylindrical surface, at least three sealing ridges located so as to be spaced from and parallel to one another and so as to extend inwardly of said substantially cylindrical surface, the upper and lower ends of said substantially cylindrical surface being continuously tapered and a continuous "Vee" groove on the exterior of said sealing member and positioned between said tapered surfaces, and top and bottom ends, said sealing member being located generally within said internal cylindrical surface with said top tapered surface being located against said beveled wall of said compression member and said bottom tapered surface being located against said beveled wall of said retainer member and wherein said retaining member and said compression member bevelled walls are bowed generally toward said tapered surfaces of said sealing member, and said sealing member being capable of flexing so that said substantially cylindrical surface is distorted so that the portion of said substantially cylindrical surface opposite said "Vee" groove is bowed inwardly from the ends of said sealing member as said bolt means are used to pull said compression and said retainer members together, such bowing causing said sealing ridges to be distorted against a cylindrical member located so as to extend through said sealing, retainer and compression members.

2. A seal structure as claimed in claim 1 wherein:

said sealing edges each have a rectangular cross-sectional configuration, the centermost of said sealing ridges being equidistant between the ends of said sealing member and said "Vee" groove being equidistant between the ends of said sealing member.

3. A seal structure as claimed in claim 1 wherein:

the walls of said "Vee" groove are located at an angle of from 30 to 60 degrees with respect to one another.

4. A seal structure as claimed in claim 1 wherein:

the depth of said "Vee" groove is from 25 to 50% of the distance between the interior and the exterior of said sealing member.

5. A seal structure as claimed in claim 1 wherein:

said sealing ridges each have a rectangular cross-sectional configuration, the centermost of said sealing ridges equidistant between the ends of said sealing member and said "Vee" groove being equidistant between the ends of said sealing member, the walls of said "Vee" groove are located at an angle of from 30 to 60 degrees with respect to one other;

the depth of said "Vee" groove is from 25 to 50% of the distance between the interior and the exterior of said sealing member.

* * * * *